United States Patent
Elser et al.

(10) Patent No.: US 6,991,580 B2
(45) Date of Patent: Jan. 31, 2006

(54) TOROIDAL VARIABLE-SPEED DRIVE UNIT

(75) Inventors: Wolfgang Elser, Remshalden (DE); Steffen Henzler, Boebingen (DE); Dinh Cuong Nguyen, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 172 days.

(21) Appl. No.: 10/366,419

(22) Filed: Feb. 14, 2003

(65) Prior Publication Data

US 2003/0176255 A1    Sep. 18, 2003

(30) Foreign Application Priority Data

Feb. 15, 2002   (DE)   ................ 102 06 200

(51) Int. Cl.
*F16H 15/38*   (2006.01)
(52) U.S. Cl. .......................... 476/46; 476/70
(58) Field of Classification Search ................ 476/46, 476/40, 42, 70
See application file for complete search history.

(56) References Cited

U.S. PATENT DOCUMENTS

| | | | |
|---|---|---|---|
| 2001/0016535 A1 * | 8/2001 | Itoh et al. ................ | 476/46 |
| 2001/0041642 A1 | 11/2001 | Miyata | |
| 2002/0019289 A1 * | 2/2002 | Ishikawa .................. | 476/46 |
| 2002/0025879 A1 * | 2/2002 | Kamamura et al. .......... | 476/46 |
| 2003/0060324 A1 * | 3/2003 | Ishikawa et al. ............ | 476/40 |
| 2003/0134711 A1 * | 7/2003 | Ishikawa et al. ............ | 476/46 |
| 2003/0176254 A1 * | 9/2003 | Elser et al. ................ | 476/40 |
| 2003/0190994 A1 * | 10/2003 | Ishikawa et al. ............ | 476/46 |
| 2004/0087412 A1 * | 5/2004 | Mori et al. ................ | 476/46 |
| 2004/0116241 A1 * | 6/2004 | Ishikawa et al. ............ | 476/46 |
| 2005/0014598 A1 * | 1/2005 | Ishikawa et al. ............ | 476/8 |

FOREIGN PATENT DOCUMENTS

| | | |
|---|---|---|
| DE | 199 47 851 A1 | 10/2000 |
| DE | 101 33 118.5 | 7/2001 |
| DE | 101 22 176 A1 | 11/2001 |

\* cited by examiner

*Primary Examiner*—David Fenstermacher
(74) *Attorney, Agent, or Firm*—Crowell & Moring LLP

(57) ABSTRACT

A toroidal variable-speed drive unit includes at least one axial offset transmission, at least one actuating member, pivotable supporting journals, and rollers arranged on the pivotable supporting journals which are coupled to one another by the at least one axial offset transmission and can be supported on the at least one actuating member, wherein the rollers are arranged between the actuating member and the at least one axial offset transmission.

28 Claims, 6 Drawing Sheets

TOROIDAL VARIABLE-SPEED DRIVE UNIT

This application claims the priority of German Patent Document No. 102 06 200.5, filed Feb. 15, 2002, the disclosure of which is expressly incorporated by reference herein.

BACKGROUND AND SUMMARY OF THE INVENTION

The invention relates to a toroidal variable-speed drive unit.

DE 101 22 176 A1 discloses such a toroidal variable-speed drive unit. This toroidal variable-speed drive unit is arranged within the transmission case of a motor vehicle transmission and has two toroidal chambers, each with two rollers. The torque is transmitted in a continuously variable manner by means of these rollers. Each of the two rollers is fastened to a supporting journal, rotatable about its own axis of rotation, and supported fixedly in terms of rotation with respect to a pivot axis of the supporting journal which is perpendicular to its own axis of rotation.

The two supporting journals form, in diagrammatic terms, the two lateral lines of a parallelogram. The upper and the lower line of the parallelogram are formed by two rockers, the central bearing receptacle of which is supported with respect to the transmission case. An axial force can be introduced into the supporting journals by means of actuating members, so that the angles of the parallelogram change. The angular movement of the parallelogram is in this case made technically possible in that the two rockers receive the supporting journals by means of articulated pivot bearings which allow a slight angular movement.

DE 199 47 851 A1 also discloses a toroidal variable-speed drive unit.

An object of the invention is to provide a cost-effective and nevertheless highly fail-safe toroidal variable-speed drive unit.

The high fail-safety is achieved advantageously in that, in addition to the "force synchronization," typical of toroidal transmissions, which constantly holds all the rollers in the correct pivot-angle position during the operation of the toroidal variable-speed drive unit, "path synchronization" ensures operation. In this "path synchronization," according to the invention, the supporting journals are received only with one side in a rocker. By contrast, on their other side, the supporting journals are supported with respect to the transmission case or to a component connected firmly to the transmission case.

This "rocker-free" support of the supporting journals in a bearing receptacle which is fixed in terms of movement with respect to the transmission case is advantageously particularly cost-effective. Thus, the articulated ends of the supporting journals can be received directly in bearing bores or plain-bearing bushes in the transmission case. This is accompanied by the advantages of a reduction in the diversity of parts.

Furthermore, a supporting plate connected fixedly in terms of movement to the transmission case may be provided for receiving the bearing bores or plain-bearing bushes. As a result, in a particularly advantageous way, the transmission case may consist of light, but also soft light metal, whilst the high forces occurring when the toroidal variable high-speed drive unit is in operation are supported in the supporting plate made from steel or cast iron.

Additionally, an embodiment of the invention allows an optimum functioning of the toroidal variable high-speed drive unit, in that the friction to be overcome in order to pivot the supporting journal about its own pivot axis is kept low by means of a rolling bearing. In a particularly advantageous way, the coefficient of friction between a convex rolling-bearing outer ring of this rolling bearing and a linear plain bearing may be designed in such a way that, in the case of an unchanged transmission ratio of the toroidal variable high-speed drive unit, the static-friction limit is not exceeded over a period of time, so that there are also no translational axial fluctuations of the supporting journal. By contrast, when a transmission ratio adjustment of the toroidal variable-speed drive unit, that is to say an axial displacement of the supporting journal, is specifically initiated, the static friction is exceeded and, because of the low sliding friction in the linear plain bearing, scarcely any wear occurs.

In an embodiment of the invention, in addition to "force synchronization" and to "path synchronization," what may be referred to as "angle synchronization" ensures to a particular extent that the rollers of the toroidal variable-speed drive unit are in the correct pivot-angle position in relation to one another. This "angle synchronization" ensures the correct pivot-angle position of the rollers in relation to one another even when the toroidal variable-speed drive unit is not in operation and the rollers are nevertheless shaken about. This situation arises, for example, when the motor vehicle is towed away or is transported on a railway wagon.

In general, one advantage of power-split motor vehicle transmissions with a toroidal variable-speed drive unit is that, as a result of the use of a power path with a constant step-up, the toroidal variable-speed drive unit is relieved within wide operating ranges. This relief is advantageous particularly in the case of high-torque engines, in which the power take-off torque of the engine is markedly above the maximum permissible input torque of the toroidal variable-speed drive unit and therefore a reduction in the torque of the variable-speed drive unit solely by the preselection of a step-up stage into high speed would not be sufficient. The said high-torque engines are conventionally installed longitudinally in drive trains.

Moreover, along with the corresponding design of the motor vehicle transmission, the relief of the toroidal variable-speed drive unit gives rise advantageously to an improvement in the overall efficiency of the motor vehicle transmission in the corresponding driving range, since the power in the power path having a constant step-up can be transmitted with higher efficiency than in that having a continuously variable step-up.

A further advantage of the relief of the toroidal variable-speed drive unit is that the pressure forces at the driving/driven discs can thereby be lowered, thus leading to a lowering of the frictional losses. As a result of the reduction in the frictional losses, less heat also has to be discharged.

Furthermore, by the toroidal variable-speed drive unit being relieved, its useful life can be increased in an advantageous way.

One advantage of apportioning the transmission step-up to at least two driving ranges is that the spread of the motor vehicle transmission is increased.

Transmission spreads which are greater than the spread of the toroidal variable-speed drive unit thus become possible.

Both driving ranges can advantageously be implemented in the power-split mode, in order to increase the efficiency.

By means of a geared-neutral function, there is advantageously no need for a starting element, such as, for example, a hydrodynamic torque converter. The implementation of a geared-neutral mode makes it possible to have operation in which the driving states forward travel, reverse travel and standstill can be achieved solely by the adjustment of the toroidal variable-speed drive unit. Furthermore, there is no need for a reversing unit, such as, for example, a turning set with associated clutches or brakes, which likewise has an advantageous effect on weight, construction space and costs.

The motor vehicle transmission is used in a particularly advantageous way in a drive train with a front engine and a rear-axle drive. Furthermore, the motor vehicle transmission is used in a particularly advantageous way in an all-wheel drive which emanates from a modified drive train with a front engine and with a rear-axle drive. Such a drive train is shown in DE 101 33 118.5 which has not already been published.

Other objects, advantages and novel features of the present invention will become apparent from the following detailed description of the invention when considered in conjunction with the accompanying drawings.

DETAILED DESCRIPTION OF THE DRAWINGS

Figure 1:
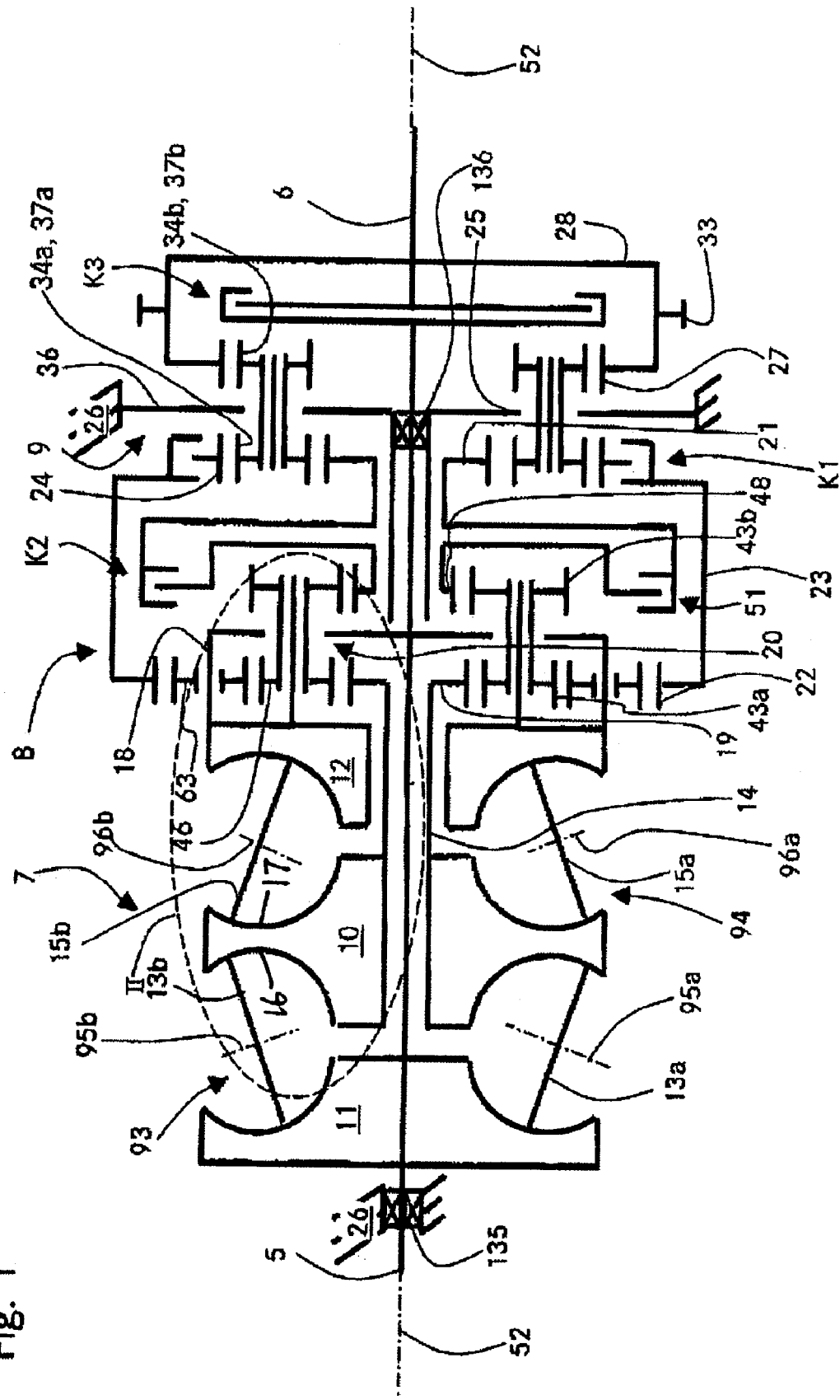
FIG. 1 shows a diagrammatic axial section through a motor vehicle transmission which comprises a continuously variable toroidal transmission, an intermediate planetary transmission and a final planetary transmission.

FIG. 1 shows a diagrammatic axial section through a motor vehicle transmission which comprises a continuously variable toroidal variable-speed drive unit 7, an intermediate planetary transmission 8 and a final planetary transmission 9.

The motor vehicle transmission is used in a drive train with a front engine and with a rear-axle drive. The motor vehicle transmission is thus arranged in the force flux between the front engine, not illustrated in any more detail, and a rear-axle transmission, by means of which rear drive shafts and consequently driving wheels are driven. The front engine is coupled to an input shaft 5 of the motor vehicle transmission and the rear-axle transmission is connected fixedly in terms of rotation by means of a cardan shaft to an output shaft 6 for the motor vehicle transmission.

By means of a friction clutch K3 arranged at the rear end of the motor vehicle transmission, the input shaft 5 can be coupled frictionally to the output shaft 6, so that a direct drive-through from the engine to the rear-axle transmission can be effected.

The input shaft 5 is mounted at its two end regions, by means of two rolling bearings 135 and 136, rotatably with respect to a non-rotating case part 26 of the motor vehicle transmission. In this case, the two rolling bearings 135 and 136 are designed as a fixed-bearing/loose-bearing pairing. The input shaft 5 is connected fixedly in terms of movement to an adjacent first toroidal central driving disc 11 of the toroidal variable-speed drive unit 7 and, via the coaxial central input shaft 5, to a double-web planet carrier 18 of the intermediate transmission 8. This planet carrier 18 is connected fixedly in terms of rotation to the second central toroidal driving disc 12, arranged adjacently to the latter, of the toroidal variable-speed drive unit 7. The two driving discs 11 and 12 are thus connected in parallel in the force flux or fixedly in terms of rotation relative to one another. A concentric intermediate shaft 14 which is arranged coaxially to the input shaft 5 and through which the latter passes with play is constructed fixedly in terms of rotation with an axially central driven disc 10. This driven disc 10 has worked into it, on its sides facing axially away from one another, the two concave toroidal driven surfaces 16 and 17. The driven disc 10 is connected fixedly in terms of movement to an inner central wheel 19 of the intermediate transmission 8.

A driving disc 11 or 12 is in frictional contact with its associated driven surface 16 or 17 via two planets, which are known as rollers 13a, 13b or 15a, 15b. In each case two rollers 13a, 13b or 15a, 15b are assigned to one of two toroidal chambers 93, 94. As explained in more detail further below with regard to FIG. 4, the rollers 13a, 13b or 15a, 15b are in each case both rotatable about their own axis of rotation 95a, 95b or 96a, 96b and pivotable about a pivot axis perpendicular to their own axis of rotation 95a, 95b.

The inner central wheel 19 of the intermediate transmission 8 has a drive connection 20 to an inner central wheel 21 as a first transmission member of the final transmission 9.

This drive connection 20 contains main planets 46 mounted on one web of the planet carrier 18 of the intermediate transmission 8 and having toothed rims 43a, 43b which are arranged on both sides of a radial drive web of the planet carrier 18 and of which one toothed rim 43a meshes with the inner central wheel 19 connected to the concentric intermediate shaft 14 and the other toothed rim 43b meshes with a second inner central wheel 48 which is arranged axially on the other side of the radial drive web and which finally, in turn, has a drive connection 51, containing an engageable and disengageable clutch K2, to the inner central wheel 21 forming the first transmission member of the final transmission 9.

The toothed rim 43a of the main planet 46, the said toothed rim meshing with the one inner central wheel 19 of the intermediate transmission 8, is additionally in meshing engagement with a secondary planet 63 which is mounted on the second web of the planet carrier 18 and, in turn, meshes with an outer central wheel 22 which is connected fixedly in terms of rotation via a pot-shaped drive connection 23 to one clutch half of an engageable and disengageable friction clutch K1. A second clutch half of this friction clutch K1 is connected fixedly in terms of rotation to an outer central wheel 24 forming a second transmission member of the final transmission 9.

The final transmission 9 has a third transmission member in the form of a planet carrier 25 which is connected fixedly in terms of rotation to the non-rotating case part 26 of the motor vehicle transmission by means of a radial supporting web 36 and which supports planet wheels 34a, 34b with two toothed rims 37a, 37b having the same number of teeth, which are arranged on both sides of the supporting web 36 and of which one toothed rim 37a adjacent to the intermediate transmission 8 meshes both with the inner and with the outer gearwheel 21 and 24.

The final transmission 9 has a fourth transmission member in the form of a second outer central wheel 27 which meshes with the other toothed rim 37b of the planet wheels 34b and which has a drive connection 28 to the output shaft 6.

A parking-lock wheel 33 is arranged concentrically and fixedly in terms of movement on the outer circumference of the outer central wheel 27.

In the lower driving range, in forward travel the clutch K1 is engaged and the clutch K2 disengaged, so that the power is split at the intermediate transmission 8, a first part of the power flowing to the power take-off shaft 6 and a second part of the power flowing via the toroidal variable-speed drive unit 7 into the drive shaft 5.

Figure 2:
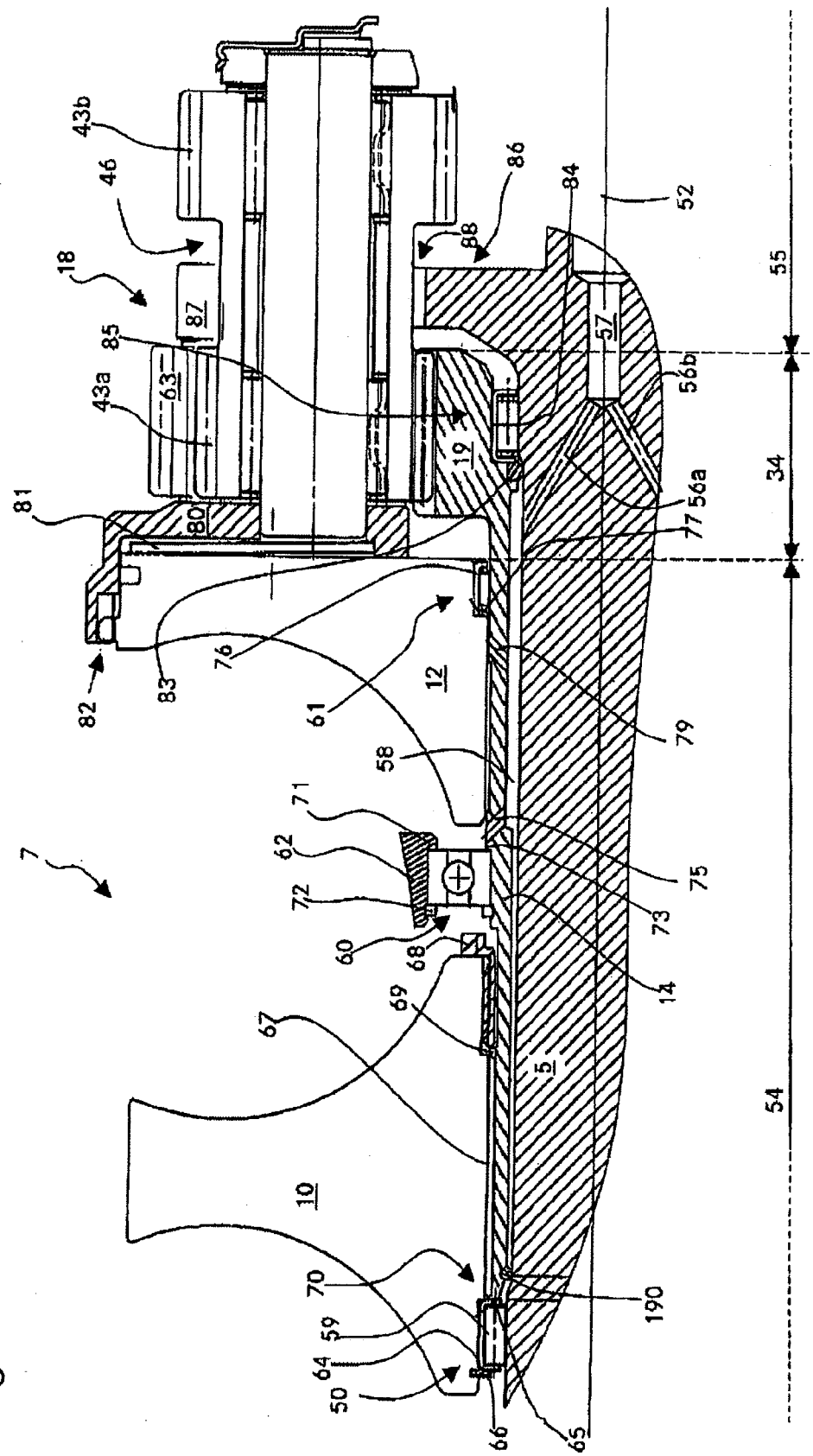
FIG. 2 shows a detailed sectional illustration of a detail II of the transmission diagram from FIG. 1, this having, inter alia, webs extending outwards in a radiating manner.

FIG. 2 shows a detailed sectional illustration of a detail II of the transmission diagram from FIG. 1, although the rollers 13b, 15b from FIG. 1 are not illustrated.

The input shaft 5 has a first axial region 54, in which the toroidal variable-speed drive unit 7 or the driving and driven discs 10, 11, 12 are also located. This first axial region 54 is designed as a solid shaft, with the result that its diameter is very small. This first axial region 54 is followed by a second axial region 34, in which a first wheel-set plane of the intermediate transmission 8 also lies, the said wheel-set plane comprising, inter alia, the inner central wheel 19,
the toothed rim 43a, and
the secondary planet 63.

Two oil ducts 56a, 56b are drilled obliquely into the solid shaft in this second axial region 34. These oil ducts 56a, 56b issue, on the one hand, into an annular space 58 and, on the other hand, into a central bore 57 of the input shaft 5, the said central bore lying essentially in a third axial region 55. The two oil ducts 56a, 56b thus make a flow connection between the central bore 57 which is under oil pressure and the annular space 58 which lies essentially in the first axial region 54. Whilst the radially inner wall of the annular space 58 is formed by the input shaft 5, the radially outer delimitation of the annular space 58 is formed by the concentric intermediate shaft 14 designed as a hollow shaft. Orifices for the outflow of lubricating oil from the annular space 58 lie at bearing points which are designed as the following rolling bearings:

a) a first needle bearing 50 for the rotatable support of the driven disc 10 with respect to the input shaft 5,
b) a single-row grooved ball bearing 60 for the axial and radial mounting of the intermediate shaft 14 with respect to a case part 62 of the motor vehicle transmission,
c) a second needle bearing 61 for the rotatable support of the second central toroidal driving disc 12 with respect to the intermediate shaft 14, and
d) a third needle bearing 85 for the radial support of the central wheel 19 with respect to the input shaft 5 in the second region 34.

a) to c) are explained in more detail below.

a) The first needle bearing 50 comprises rolling bodies which are arranged within a cage 64 and roll on the input shaft 5 in a region in which the latter is designed as a solid shaft. The cage 64 is inserted into a central bore of the driven disc 10 and bears axially, on the one hand, against an end face 65 of one end 70 of the intermediate shaft 14. On the other hand, the cage 64 bears axially against an axial securing ring 66 which is inserted into an inner groove at one axial end of the driven disc 10. At the other axial end of the driven disc 10, the latter is screwed to an externally threaded sleeve 68, of which the radially outward-projecting end collar bears axially against an end face of the driven disc 10. Axially between the first needle bearing 50 and the externally threaded sleeve 68, the driven disc 10 is connected fixedly in terms of rotation to the intermediate shaft 14 by means of a splined-shaft toothing 67. In this case, a slight axial play is allowed between the cage 64 and the end face 65 or between the externally threaded sleeve 68 and an external toothing 69, associated with the splined-shaft toothing 67, of the input shaft 5.

The lubrication of the large needle bearing 50 takes place by means of lubricating oil which emerges, past a sealing ring 190 functioning as a virtual throttle, from the annular space 58 at the end 70 of the intermediate shaft 14.

b) The grooved ball bearing 60 has a bearing outer ring which is secured in the axial direction with respect to the case part 62, on the one hand, at a step 71 and, on the other hand, at an axial securing ring 72 which is inserted into an inner groove of the case part 62.

In a similar way, a bearing inner ring of the grooved ball bearing 60 is secured in the axial direction with respect to the intermediate shaft 14, on the one hand, at a step 73 and, on the other hand, at an axial securing ring 74 which is inserted into a circumferential groove of the intermediate shaft 14.

The lubrication of the grooved ball bearing 60 takes place by means of lubricating oil which emerges from the annular space 58 through an oblique bore 75 in the intermediate shaft 14. This bore 75 is arranged axially next to the grooved ball bearing 60 and is directed towards the rolling body of the latter.

c) The second needle bearing 61 comprising rolling bodies which are arranged within a cage 76 and roll on the intermediate shaft 14. The cage 76 is pressed into a central bore of the driven disc 12 and bears axially against an end face 77 of a bore bottom of this central bore.

An oblique bore 79, which supplies the second needle bearing 61 with lubricating oil, is drilled into the intermediate shaft 14 radially within the driven disc 12 and axially next to the second needle bearing 61.

As a consequence of the system, the driven disc 12 is fixed in terms of rotation and axially prestressed with respect to a planet-carrier bolt receptacle 80 of the planet carrier 18 by means of an axial toothing 82 and a cup spring 81.

The annular space 58 is sealed off, on its side facing the intermediate transmission 8, by means of a sealing ring 83 which is inserted into a concentric bore of the central wheel 19 produced in one part with the intermediate shaft 14 and which functions as a virtual throttle in that the sealing ring 83 allows a defined leakage. The sealing ring 83 is secured by means of a cage 84 of the third needle bearing 85. The sealing ring 83 bears with its inside against the input shaft 5 axially next to the two oil ducts 56a, 56b and allows the defined leakage throughflow for the supply of lubricant to the third needle bearing 85, whilst maintaining a lubricant pressure in the annular space 58.

A planet-carrier arm 86 extends radially outwards in the third region 55 axially next to the central wheel 19. This planet-carrier arm 86 has webs 87 which extend outwards in a radiating manner and which are interrupted circumferentially by recesses 88. The main planets 46 pass through these recesses 88, so that the toothed rims 43a, 43b are adjacent to the planet-carrier arm 86 on both sides.

Figure 3:
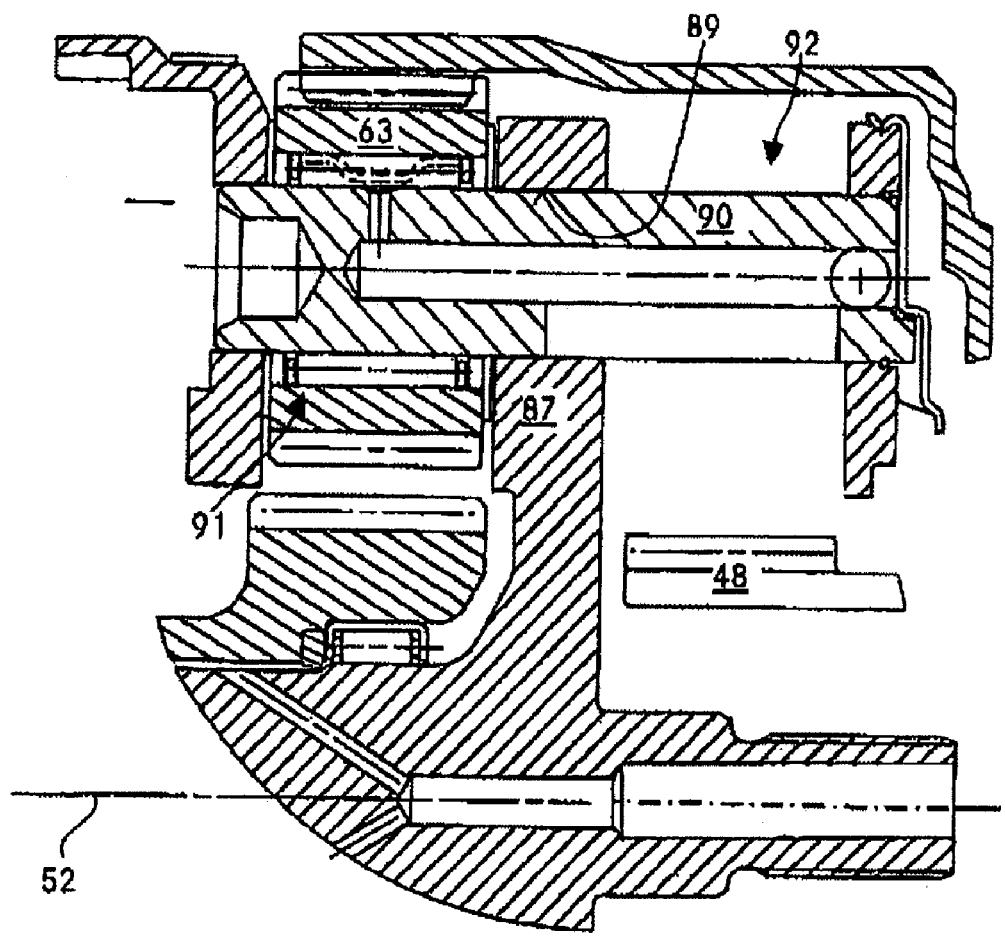
FIG. 3 shows a section through one of the webs from FIG. 2 in a detail.

FIG. 3 shows, in a detail, a section through one of the webs 87 extending outwards in a radiating manner. The webs 87 are designed identically, and therefore only one of the three webs 87 distributed uniformly on the circumference is explained below.

The web 87 has, radially on the outside, a bore 89 which is oriented parallel to a central axis 52, also evident in FIG. 1 and FIG. 2, of the motor vehicle transmission and into which a planet-carrier bolt 90 of the secondary planet 63 is inserted with a press fit. This press fit is located centrally on the planet-carrier bolt 90, so that the latter projects axially with an end region 91 facing the toroidal variable-speed drive unit 7 and with an end region 92 facing away from the latter. The planet-carrier bolt 90 has on the end region 92 facing away, radially on the inside, a long hole which issues into a central concentric blind-hole bore. This blind-hole bore is closed at its access orifice by means of a ball. At the bottom of the blind-hole bore, the said bottom being located in the other end region 91, there is, in the planet-carrier bolt 90, a transverse bore which makes a flow connection from the blind-hole bore to a needle mounting of the secondary planet 63.

Arranged radially inwards from the planet-carrier bolt 90 is the second inner central wheel 48 which meshes with the toothed rim 43b not evident in the drawing plane of FIG. 3. This central wheel 48, which rotates during driving, throws radially outwards, as a result of the centrifugal force, lubricating oil of which a fraction passes through the long hole,
the blind-hole bore and
the transverse bore to the needle mounting of the secondary planet 63, so that the said needle mounting is always lubricated and cooled in a low-friction and fail-safe manner.

Figure 4:
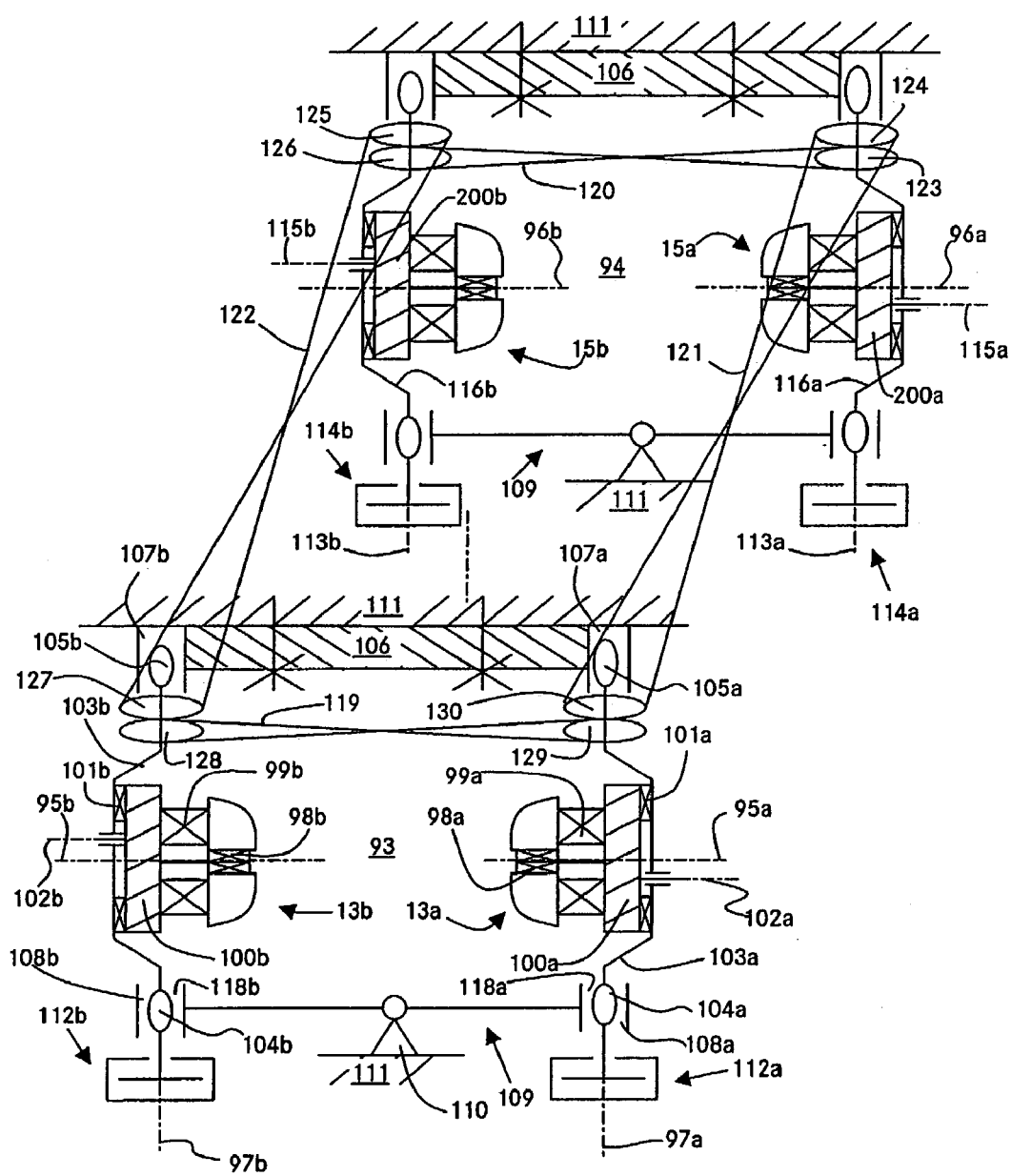
FIG. 4 shows a basic diagrammatic section to explain the function of the rollers of the toroidal variable-speed drive unit according to FIG. 1.

FIG. 4 shows a basic diagrammatic section through the rollers 13a, 13b of the first toroidal chamber 93 and the rollers 15a, 15b of the second toroidal chamber 94 of the toroidal variable-speed drive unit 7 according to FIG. 1. For the sake of greater clarity, the driving discs and driven disc are not illustrated. The basic diagrammatic section is illustrated in the actual installation position of the motor vehicle transmission, so that components lying below in the installation position are designated hereafter as being arranged "below" and components lying above in the installation position are designated hereafter as being arranged "above."

Since the four rollers 13a, 13b, 15a, 15b of the two toroidal chambers 93, 94 are designed essentially identically and have identical functioning, the common features are first explained hereafter with reference to the rollers 13a, 13b of one toroidal chamber 93.

The two rollers 13a, 13b are both rotatable about their own axis of rotation 95a, 95b and pivotable about a pivot axis 97a, 97b perpendicular to their own axis of rotation 95a, 95b. For this purpose, each of the rollers 13a, 13b is mounted rotatably about its own axis of rotation 95a, 95b by means of two bearings 98a or 98b and 99a or 99b on an eccentric journal 100a or 100b which is arranged by means of a thrust-type needle bearing 101a or 101b so as to be slightly pivotable about a further pivot axis 102a or 102b arranged, offset, parallel to the axis of rotation 95a or 95b. In this case, the eccentric journal 100a or 100b is received, mounted by rolling bearings, pivotably about this further pivot axis 102a or 102b in a supporting journal 103a or 103b. This supporting journal 103a or 103b extends perpendicularly to the axis of rotation 95a, 95b or to the further pivot axis 102a or 102b and at its two ends 104a, 105a or 104b, 105b has rolling bearings with crowned bearing outer rings. These bearing outer rings or ends 104a, 105a or 104b, 105b are received, on the one hand, in bores 107a or 107b of a steel supporting plate 106 and, on the other hand, in bores 108a or 108b of a rocker 109. Both the supporting plate 106 and a central rocker bearing 110 of the rocker 109 are connected fixedly in terms of movement to a light-metal transmission case 111 of the motor vehicle transmission.

The lower ends 108a and 108b of the supporting journals 103a, 103b are supported axially against pistons of hydraulic axial actuating members 112a, 112b which are arranged below the supporting journal 103a, 103b. The cylinders of the hydraulic axial actuating members 112a, 112b are supported axially with respect to the said light-metal transmission case 111 in a way not illustrated in any more detail. Below the hydraulic axial actuating members 112a, 112b is arranged an electrohydraulic control plate, not illustrated in any more detail, of the motor vehicle transmission. This control plate has solenoid valves and control slides for controlling or regulating the clutches K1, K2, K3 and the axial actuating members 112a, 112b.

The torque transmission of the toroidal variable-speed drive unit 7 takes place by the rotation of the rollers 13a, 13b about their own axis of rotation 95a, 95b. By contrast, the transmission ratio of the toroidal variable-speed drive unit 7 is adjusted by pivoting about the pivot axis 97a, 97b.

Reference is made below, once again, to the two toroidal chambers 93 and 94.

To initiate the abovementioned pivoting about the pivot axes 97a, 97b, 113a, 113b, the axial actuating members 112a and 114a or 112b and 114b are acted upon by hydraulic pressure. At the same time, in each case, the pistons located on the same side are acted upon by pressure. During this action of pressure, all four rollers 13a, 15a, 13b, 15b pivot about their pivot axes 97a, 97b as a result of the forces acting at the rolling points between the rollers 13a and 15a or 13b and 15b and the driving/driven disc 10, 11, 12 of the toroidal variable-speed drive unit 7, until a force equilibrium has been established again at the rollers 13a, 15a, 13b, 15b and axial actuating members 112a, 114a, 112b, 114b. Thus, by means of the new pivot-angle position about the pivot axes 97a, 97b, 113a, 113b, a new transmission ratio of the toroidal variable-speed drive unit 7 is set continuously and without any interruption in traction.

As a result of the identical hydraulic supporting forces and similar frictional forces and therefore similar forces in rolling contact, all four rollers 13a, 13b, 15a, 15b assume the same pivot-angle position in terms of amount with regard to their four pivot axes 97a, 97b, 113a, 113b, their arrangement being symmetrical to one another. This orientation of the pivot-angle position of the rollers in relation to one another, which is achieved in this way, is designated as what may be referred to as "force synchronization."

In the event of the abovementioned hydraulic pressure change at the two axial actuating members 112a, 114a or 112b, 114b of one side, the rocker 109 pivots, since the two supporting journals 103a, 116a or 103b, 116b are displaced axially with respect to their pivot axes 97a, 113a or 97b, 113b, and, between their lower bearing outer rings and the rocker 109, friction occurs in the region of their bores 108a, 118a or 108b, 118b. As a result of the articulated crowned receptacle, the angle between the rocker 109 and the supporting journals 103a, 103b, 116a, 116b changes. Owing to these changed geometric conditions, all four rollers 13a, 13b, 15a, 15b have forced upon them a path leading to a pivot-angle position in which the rollers 13a, 13b, 15a, 15b are arranged symmetrically to one another. This second synchronization ensuring safety in addition to the "force synchronization" is designated as what may be referred to as "path synchronization."

The toroidal variable-speed drive unit 7 has, in addition to these two synchronizations, a third synchronization which, even with the input shaft 5 at a standstill, ensures the abovementioned symmetrical arrangement of all the supporting journals 103a, 103b, 116a, 116b of the rollers 13a, 13b, 15a, 15b to one another. This synchronization, designated as what may be referred to as "angle synchronization," takes place by means of four belts 119, 120, 121, 122 which connect to one another, on the one hand, the two supporting journals 103a and 103b or 116a and 116b belonging to a toroidal chamber 93 or 94 and, on the other hand, the two supporting journals 103a and 116a or 103b and 116b arranged on the respective side, that is to say on the right or on the left. The four belts 119, 120, 121, 122 are in this case each simply looped crosswise, in order to bring about a reversal of direction of rotation during the pivoting of the supporting journals 103a, 103b, 116a, 116b. The four supporting journals 103a, 103b, 116a, 116b have, between their upper ends and their middle region in which the rollers 13a, 13b, 15a, 15b are arranged, two take-up discs 123, 124, 125, 126, 127, 128, 129, 130 arranged axially adjacently with respect to the pivot axes 97a, 97b, 113a, 113b. The four belts 119, 120, 121, 122 are looped in each case around two of these take-up discs, the two belts 119, 120 associated with the individual toroidal chambers 93 and 94 being arranged in a lower plane, and the two belts 121, 122 connecting the supporting journals 103a, 103b, 116a, 116b of the two toroidal chambers 93 and 94 being arranged in an upper plane.

Figure 5:
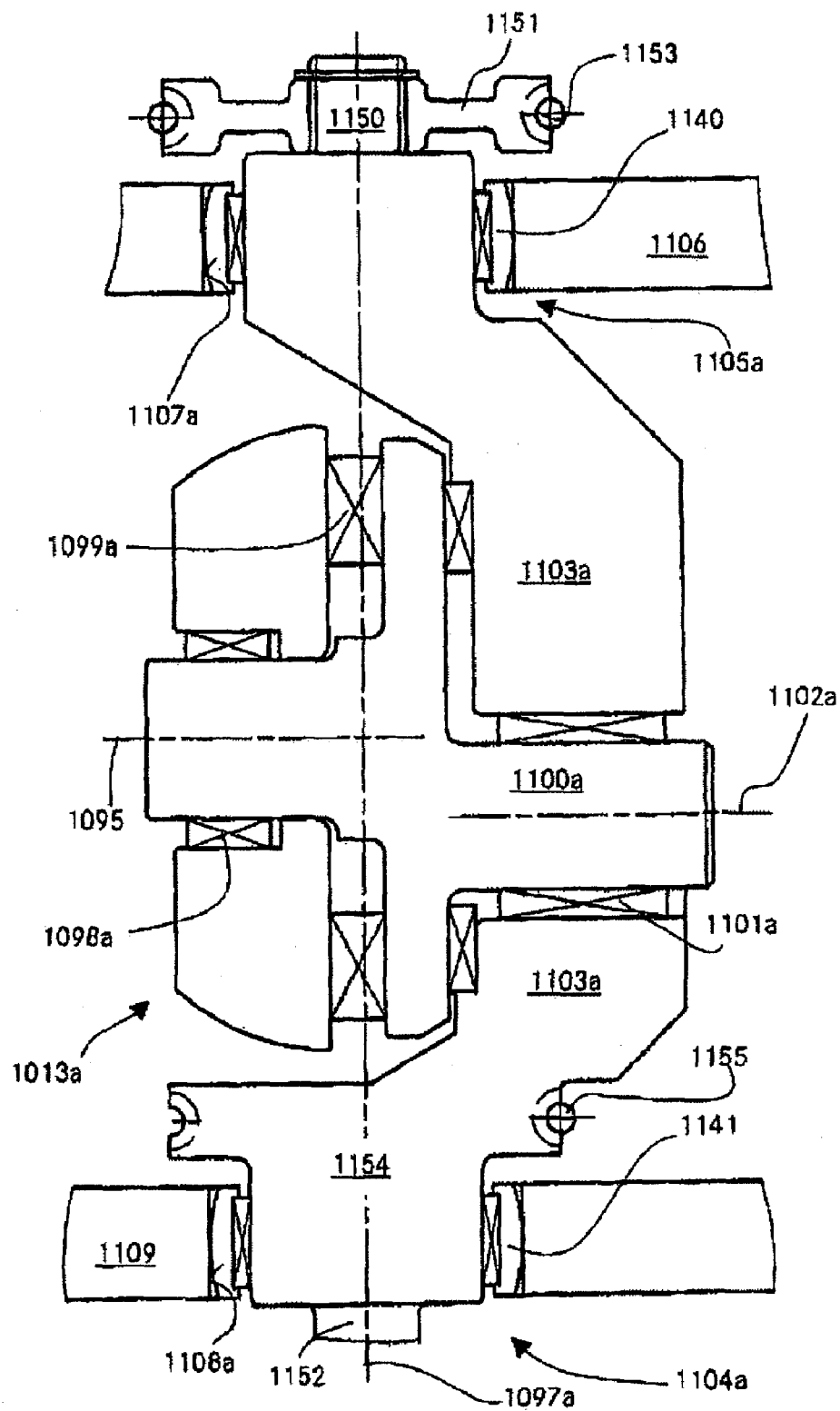
FIG. 5 shows, in a first alternative embodiment of a roller, the latter and its supporting journal in detail in a sectional illustration.

FIG. 5, in a first alternative embodiment of a roller 1013a, shows the latter in detail in a sectional illustration.

The roller 1013a is both rotatable about its own axis of rotation 1095a and pivotable about a pivot axis 1097a perpendicular to its own axis of rotation 1095a. For this purpose, the roller 1013a is mounted by means of two bearings 1098a and 1099a rotatably about its own axis of rotation 1095a on an eccentric journal 1100a which, by means of a thrust-type needle bearing 1101a, is arranged so as to be slightly pivotable about a further pivot axis 1102a arranged, offset, parallel to the axis of rotation 1095a. In this case, the eccentric journal 1100a is received, mounted by rolling bearings, pivotably about this further pivot axis 1102a in a supporting journal 1103a. This supporting journal 1103a is bulged out in a middle region. The roller 1013a is arranged in this middle region. The supporting journal 1103a extends essentially perpendicularly to the axis of rotation 1095a or to the further pivot axis 1102a and at its two ends 1104a, 1105a has needle bearings with bearing outer rings 1140, 1141 designed to be crowned on the outside. The upper bearing outer ring 1140 is received in a bore 1107a of a steel supporting plate 1106 and the lower bearing outer ring 1141 is received in a bore 1108a of a rocker 1109. Both the supporting plate 1106 and a bearing receptacle, not illustrated in any more detail, of the rocker 1109 are connected fixedly in terms of movement to a light-metal transmission case, not illustrated in any more detail, of the motor vehicle transmission.

The supporting journal 1103a is provided, above the upper needle bearing, with a journal 1150 which is designed coaxially with the pivot axis 1097a and which is connected fixedly in terms of rotation and axially non-displaceably to a take-up disc 1151 by means of a splined-shaft toothing and a shaft securing ring. Looped around this take-up disc 1151 is a toothed belt 1153 which connects the supporting journal 1103a illustrated to a supporting journal, not evident in FIG. 5, of the same toroidal chamber. The belt 1153 is in this case simply looped crosswise, so that the supporting journal, not evident, of the same toroidal chamber always rotates in the opposite direction.

Between the lower needle bearing and the roller 1013a, the supporting journal 1103a is produced in one part with a take-up disc 1154. A belt 1155 is simply looped crosswise around this take-up disc 1154 and connects the supporting journal 1103a illustrated to a supporting journal, not evident in FIG. 5, of a second toroidal chamber, in such a way that the supporting journal of the second toroidal chamber always rotates in the opposite direction.

The supporting journal 1103a is provided, below the lower needle bearing, with a journal 1152 which is designed coaxially to the pivot axis 1097a and which is supported axially on a hydraulic axial actuating member not illustrated in any more detail. Below this hydraulic axial actuating member is arranged an electrohydraulic control plate, not illustrated in any more detail, for the control of the axial actuating member, of further axial actuating members and of clutches according to FIG. 1.

Figure 6:
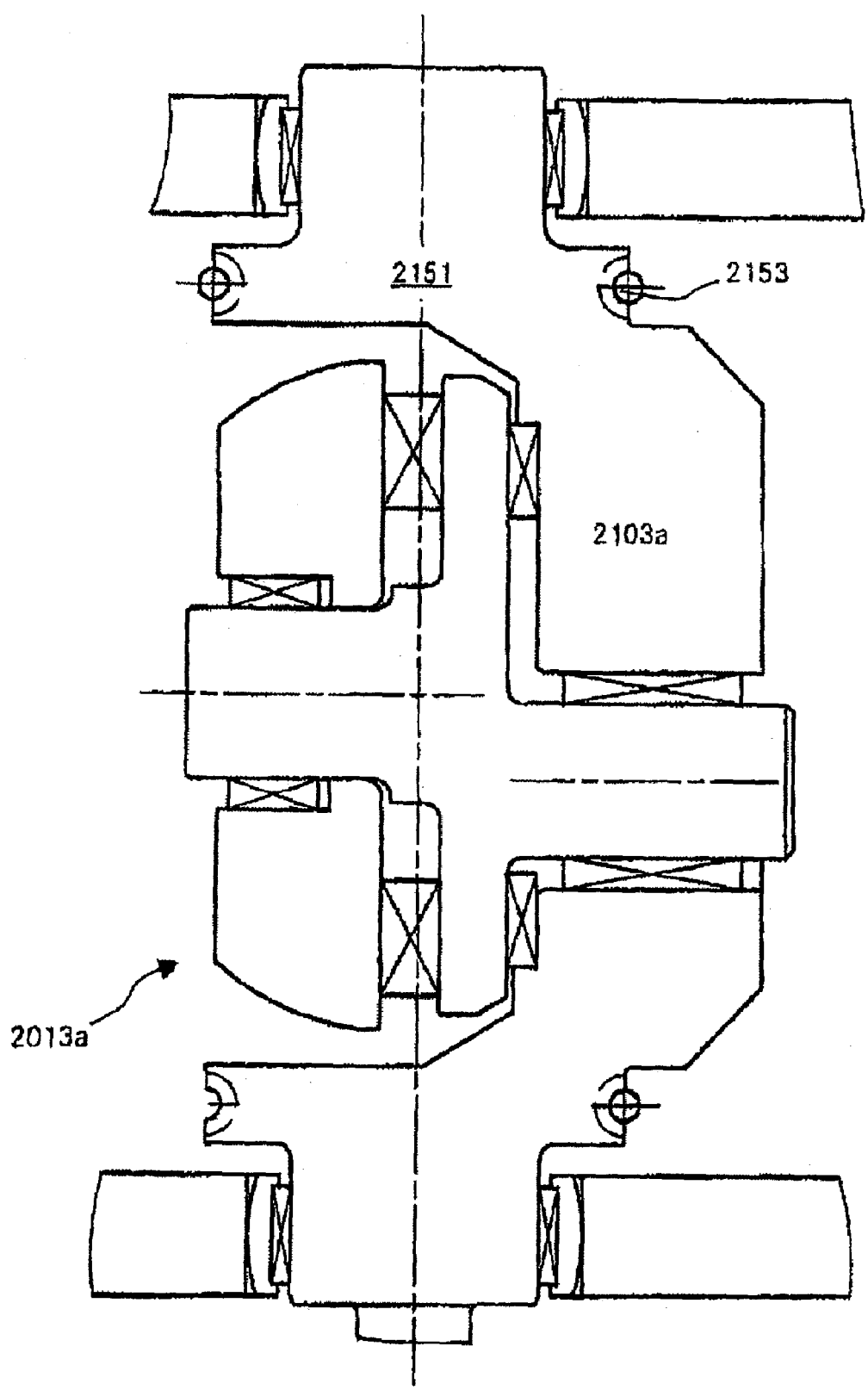
FIG. 6 shows, in a second alternative embodiment of a roller, the latter and its supporting journal in detail in a sectional illustration.

FIG. 6, in a second alternative embodiment of a roller, shows the latter in detail in a sectional illustration.

The roller 2013a and the supporting journal 2103a are designed in broad parts in a similar way to the roller of the first alternative embodiment, and therefore only the essential differences are dealt with below.

Instead of a take-up disc arranged above an upper needle bearing, the supporting journal 2103a is produced, in a region between the upper needle bearing and the roller 2013a, in one part with a take-up disc 2151. Looped around this take-up disc 2151 is a belt 2153 which connects the supporting journal 2103a illustrated to a supporting journal, not evident in FIG. 6, of the same toroidal chamber. The belt 2153 is in this case simply looped crosswise, so that the supporting journal, not evident, of the same toroidal chamber always rotates in the opposite direction.

The bearings for mounting the supporting journal may also be designed as barrel-shaped bearings, in which case a crowned bearing outer ring is dispensed with and the barrel-shaped rolling bodies are arranged directly in the bores of the rocker and the bores of the supporting plate.

Furthermore, instead of the bores for receiving the bearing outer rings, linear bearings may be provided both in the supporting plate and in the rocker.

The take-up discs or the belts which connect the supporting journals to one another perform the function of an axial offset transmission. Consequently, for codirectional torque transmission with a transmission ratio of 1:1, the supporting journals may also be connected via an odd number of gearwheels, by means of toothed belts, by means of linkages or else by means of slotted guides.

Instead of the two oil ducts, any number of oil ducts offset circumferentially, at an angle or radially may be drilled into the solid shaft. If appropriate, a single oil duct may be sufficient.

Instead of the oblique bore, illustrated in FIG. 1, in the intermediate shaft for the supply of lubricating oil to the grooved ball bearing, a bore may also be provided which is oriented transversely to the central axis and which is directed towards an oil baffle of the grooved ball bearing.

Instead of the two sealing rings, illustrated in FIG. 2, which function as a virtual throttle, the intermediate shaft designed as a hollow shaft and the input shaft arranged within the latter may be provided with a fit. Then, instead of the sealing rings, the fit functions as a virtual throttle.

The illustrated clutches for selecting the driving range may be designed as a friction clutch, as a positive clutch, such as, for example, a claw clutch, or as a combined friction and positive clutch, such as, for example, a synchronizing device.

In particular, the clutch arranged at the rear end of the motor vehicle transmission may be designed, for the purpose of direct drive-through, as a friction clutch or as a positive clutch or, alternatively, as a combined positive and friction clutch.

The illustrated coaxial motor vehicle transmission with a continuously variable toroidal variable-speed drive unit and with a geared-neutral function is appropriate, furthermore, for all-wheel drive, such as is illustrated in DE 101 33 118.5. In this case, the transmission take-off shaft may be followed by a power divider for all-wheel drive.

Depending on the construction space available in the axial direction of the drive train, the motor vehicle transmission may have any number of driving ranges. In this case, one driving range may be designed as a direct gear, in which the engine rotational speed is conducted directly to the transmission take-off shaft, without any meshing engagement of gearwheels, so that particularly high efficiency is achieved. In particular, such a direct gear is appropriate in vehicles with a consumption characteristic diagram having a flat profile, that is to say with low consumption over a wide rotational speed range.

Further power-split driving ranges which have additional planet sets and clutches are appropriate.

The motor vehicle transmission may have an input step-up stage which, however, makes it possible to have selectively a step-up to high speed or to a low speed.

The parking-lock wheel shown in FIG. 1 may be arranged in alternative embodiments at any desired point on the output shaft.

The embodiments described are merely exemplary embodiments. A combination of the features described for different embodiments is likewise possible. Further, in particular undescribed features of the device parts belonging to the invention may be gathered from the geometries, illustrated in the drawings, of the device parts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A toroidal variable-speed drive unit arranged within a transmission case, the unit comprising:
    at least one toroidal chamber including at least two rollers, each of the at least two rollers is rotatable about its own axis of rotation;
    a supporting journal for each of the at least two rollers, wherein each roller is supported fixedly in terms of rotation with respect to a pivot axis of the supporting journal which is perpendicular to its own axis of rotation; and
    first and second bearings for each supporting journal, wherein each supporting journal is received pivotably and axially displaceably with respect to its pivot axis in the first and second bearings, wherein the first bearing is arranged in a rocker, and wherein the second bearing includes a bearing receptacle which is fixed in terms of movement with respect to the transmission case.

2. The toroidal variable-speed drive unit according to claim 1, wherein each roller is arranged between the first bearing and the second bearing.

3. The toroidal variable-speed drive unit according to claim 2, wherein each rocker includes a rocker bearing arranged centrally between the two first bearings.

4. The toroidal variable-speed drive unit according to claim 2, wherein the transmission case includes a light metal, wherein the unit further comprises a supporting plate which is connected fixedly in terms of movement to the transmission case and which includes a steel or cast iron, and wherein the bearing receptacles are arranged in the supporting plate.

5. The toroidal variable-speed drive unit according to claim 2, further comprising convex rolling-bearing outer rings, wherein the bearing receptacles are linear plain bearings and wherein the supporting journals are received in the linear plain bearings in an articulated manner using the convex rolling-bearing outer rings.

6. The toroidal variable-speed drive unit according to claim 2, further comprising axial offset transmissions, wherein the supporting journals of the toroidal chamber are coupled to one another with the axial offset transmissions.

7. The toroidal variable-speed drive unit according to claim 2, further comprising at least one axial offset transmission and a second toroidal chamber which is substantially similar to the first toroidal chamber, the supporting journals of the second toroidal chamber are connected in a torque-transmitting manner to the supporting journals of the first toroidal chamber with the at least one axial offset transmission.

8. The toroidal variable-speed drive unit according to claim 2, further comprising axial actuating members, wherein the supporting journals can be supported at one end on the axial actuating members, the rocker being arranged between these axial actuating members and the rollers, wherein the bearing receptacle arranged fixedly in terms of movement with respect to the transmission case is arranged at the other end of the supporting journals.

9. The toroidal variable-speed drive unit according to claim 1, wherein each rocker includes a rocker bearing arranged centrally between the two first bearings.

10. The toroidal variable-speed drive unit according to claim 1, wherein the transmission case includes a light metal, wherein the unit further comprises a supporting plate which is connected fixedly in terms of movement to the transmission case and which includes a steel or cast iron, and wherein the bearing receptacles are arranged in the supporting plate.

11. The toroidal variable-speed drive unit according to claim 1, further comprising convex rolling-bearing outer rings, wherein the bearing receptacles are linear plain bearings and wherein the supporting journals are received in the linear plain bearings in an articulated manner using the convex rolling-bearing outer rings.

12. The toroidal variable-speed drive unit according to claim 1, further comprising axial offset transmissions, wherein the supporting journals of the toroidal chamber are coupled to one another with the axial offset transmissions.

13. The toroidal variable-speed drive unit according to claim 1, further comprising a second toroidal chamber which is substantially similar to the first toroidal chamber, the supporting journals of the second toroidal chamber are connected in a torque-transmitting manner to the supporting journals of the first toroidal chamber (93) with at least one axial offset transmission.

14. The toroidal variable-speed drive unit according to claim 1, further comprising axial actuating members, wherein the supporting journals can be supported at one end on the axial actuating members, the rocker being arranged between these axial actuating members and the rollers, wherein the bearing receptacle arranged fixedly in terms of movement with respect to the transmission case is arranged at the other end of the supporting journals.

15. A method for making a toroidal variable-speed drive unit arranged within a transmission case, the method comprising:
  providing at least one toroidal chamber that includes at least two rollers, each of the at least two rollers is rotatable about its own axis of rotation;
  providing a supporting journal for each of the at least two rollers, and supporting each roller fixedly in terms of rotation with respect to a pivot axis of the supporting journal which is perpendicular to its own axis of rotation;
  providing first and second bearings for each supporting journal;
  placing each supporting journal pivotably and axially displaceably with respect to its pivot axis in the first and second bearings;
  arranging the first bearing in a rocker; and
  fixing a bearing receptacle of the second bearing in terms of movement with respect to the transmission case.

16. The method according to claim 15, further comprising arranging each roller between the first bearing and the second bearing.

17. The method according to claim 16, further comprising centrally arranging a rocker bearing of each rocker between the two first bearings.

18. The method according to claim 16, wherein the transmission case includes a light metal, the method further comprising connecting fixedly a supporting plate, which includes a steel or cast iron, in terms of movement to the transmission case and, and arranging the bearing receptacles in the supporting plate.

19. The method according to claim 16, further comprising convex rolling-bearing outer rings, wherein the bearing receptacles are linear plain bearings and wherein the supporting journals are received in the linear plain bearings in an articulated manner using the convex rolling-bearing outer rings.

20. The method according to claim 16, further comprising coupling the supporting journals of the toroidal chamber to one another with axial offset transmissions.

21. The method according to claim 16, further comprising providing a second toroidal chamber which is substantially similar to the first toroidal chamber, and connecting the supporting journals of the second toroidal chamber in a torque-transmitting manner to the supporting journals of the first toroidal chamber with at least one axial offset transmission.

22. The method according to claim 16, further comprising supporting the supporting journals at one end on axial actuating members, arranging the rocker between these axial actuating members and the rollers, and arranging the bearing receptacle arranged fixedly in terms of movement with respect to the transmission case at the other end of the supporting journals.

23. The method according to claim 15, further comprising centrally arranging a rocker bearing of each rocker between the two first bearings.

24. The method according to claim 15, wherein the transmission case includes a light metal, the method further comprising connecting fixedly a supporting plate, which includes a steel or cast iron, in terms of movement to the transmission case and, and arranging the bearing receptacles in the supporting plate.

25. The method according to claim 15, further comprising convex rolling-bearing outer rings, wherein the bearing receptacles are linear plain bearings and wherein the supporting journals are received in the linear plain bearings in an articulated manner using the convex rolling-bearing outer rings.

26. The method according to claim 15, further comprising coupling the supporting journals of the toroidal chamber to one another with axial offset transmissions.

27. The method according to claim 15, further comprising providing a second toroidal chamber which is substantially similar to the first toroidal chamber, and connecting the supporting journals of the second toroidal chamber in a torque-transmitting manner to the supporting journals of the first toroidal chamber with at least one axial offset transmission.

28. The method according to claim 15, further comprising supporting the supporting journals at one end on axial actuating members, arranging the rocker between these axial actuating members and the rollers, and arranging the bearing receptacle arranged fixedly in terms of movement with respect to the transmission case at the other end of the supporting journals.

* * * * *